Aug. 22, 1961     L. G. PETRICH     2,997,655
WAVE GUIDE BRANCHING ARRANGEMENTS
Filed Oct. 5, 1948     2 Sheets-Sheet 1
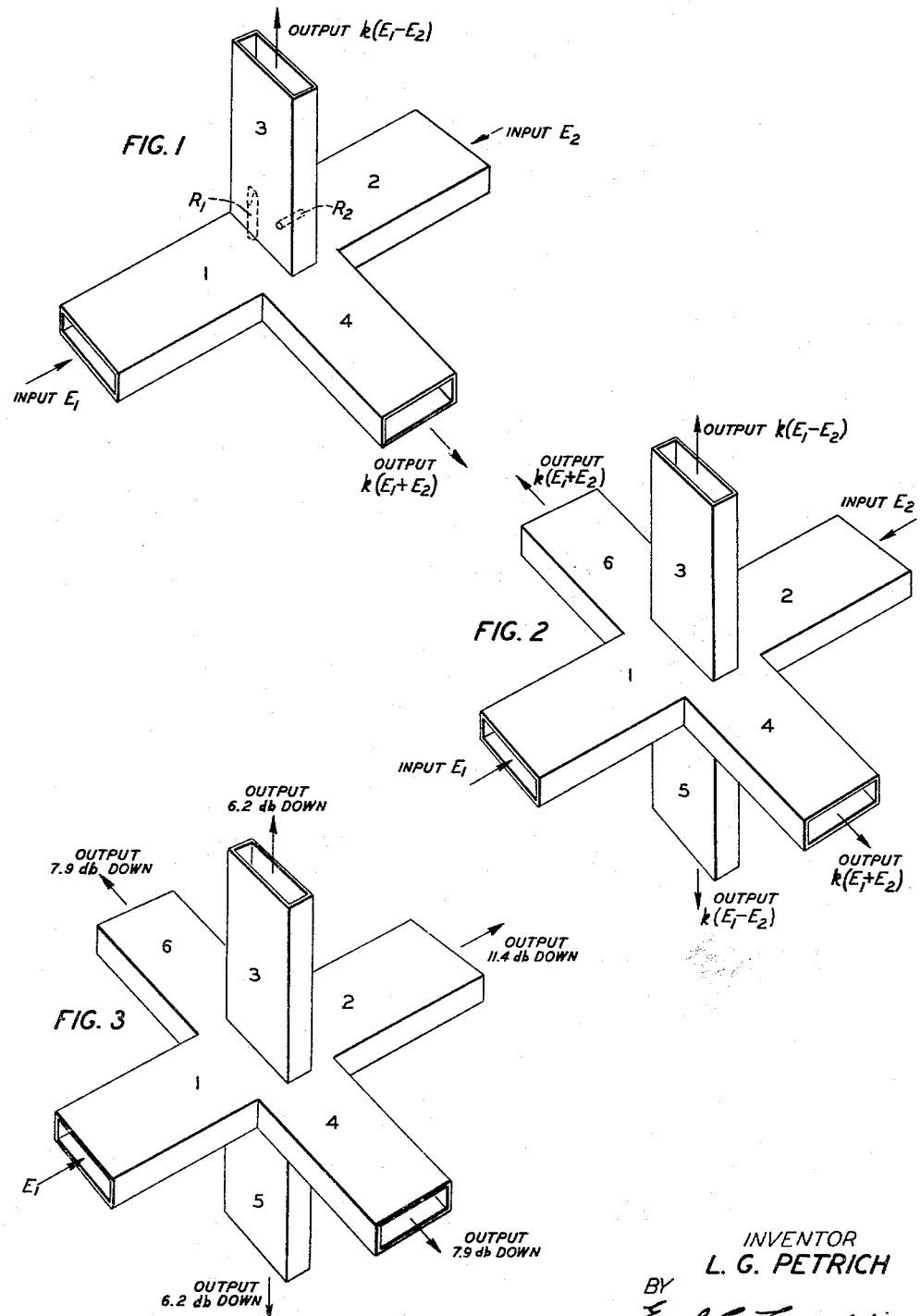
INVENTOR
L. G. PETRICH
BY
ATTORNEY

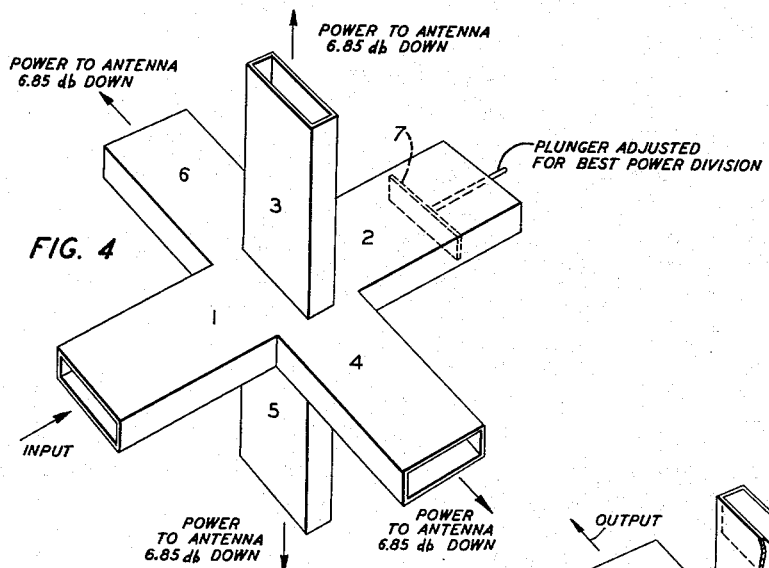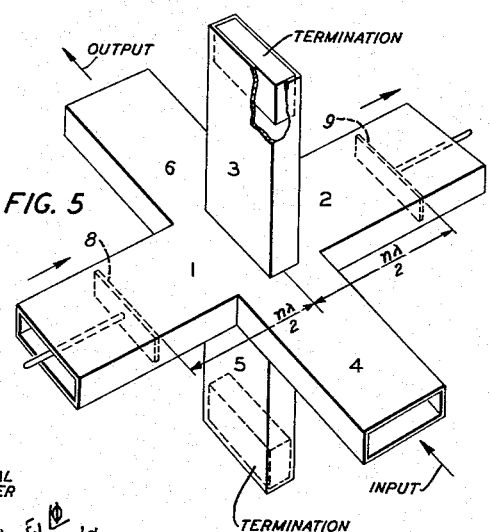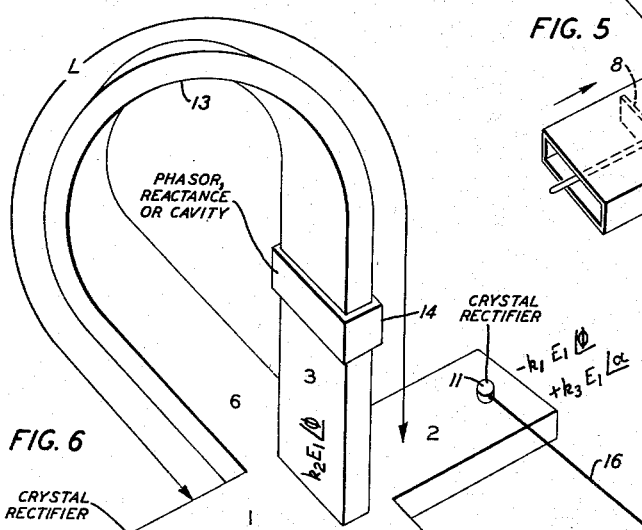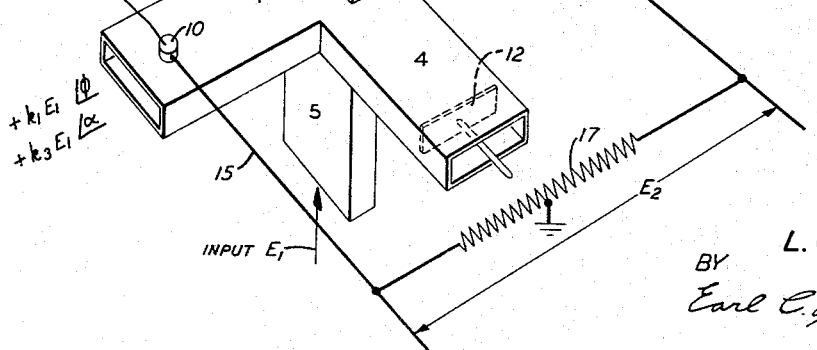

United States Patent Office
2,997,655
Patented Aug. 22, 1961

2,997,655
WAVE GUIDE BRANCHING ARRANGEMENTS
Louis G. Petrich, Lake Parsippanny, N.J., assignor to Bell Telephone Laboratories, Incorporated, New York, N.Y., a corporation of New York
Filed Oct. 5, 1948, Ser. No. 52,828
14 Claims. (Cl. 329—116)

The invention relates to guided wave transmission systems and particularly to transmission networks employed in said systems for wave power division and other useful purposes.

The United States patent of W. A. Tyrrell No. 2,445,895, issued July 27, 1948 discloses a number of four-arm electrical networks employing branching arrangements of wave-guide, coaxial or other types of lines, or combinations of them, having balance properties akin to those of the hybrid coil common in voice frequency communication practice, which networks are particularly adapted for use as duplex balancers or power dividers in systems transmitting ultra-high frequency electromagnetic wave energy.

One type of network disclosed in the Tyrrell patent, commonly referred to as a "hydrid junction," comprises a main section of transmission line consisting of wave guide and two transmission branches composed of wave guide, coaxial or other type of line, disposed at right angles to each other, joined to the main wave-guide line at an intermediate, common junction point in the electric or E-plane, equivalent to a series electrical connection, and in the magnetic or H-plane, equivalent to a shunt or parallel electrical connection, respectively. Due mainly to the dissimilar electrical connections of the two branch arms of this network with the main wave-guide line, these two branch arms are conjugate and in balanced electrical relationship with respect to each other; when properly matched, the two collinear portions of the main wave-guide line extending to opposite sides of the junction point, forming the other two branch arms of the network, are also conjugate and in balanced electrical relation with respect to each other; and each of the latter two branch arms is in unbalanced electrical relation with respect to the first two branch arms of the network. Therefore, if a wave generator is connected to any branch arm of this network so as to supply electromagnetic wave power thereover towards the common junction point, and suitable loads are connected to the other three branch arms, this power will be divided equally between the loads connected to the two branch arms in unbalanced electrical relation with respect to the input arm, and substantially none of this power will be supplied to the load connected to the fourth branch arm which is in conjugate relation with respect to the input arm.

One object of the invention is to improve the above-described general type of hybrid junction from the standpoint of making it adaptable for more general use.

A more specific object is to adapt the above-described general type of hybrid junction for providing a desired distribution of wave power supplied from a single power source between a greater number of output circuits or loads, for example, three, four or five circuits or loads, while maintaining certain of these circuits or loads effectively isolated from each other.

These objects are accomplished in accordance with the invention by adding additional branch arms to the four-arm type of hybrid junction, which are conjugate or in balanced electrical relation with respect to each other and certain of the other branch arms and in unbalanced electrical relationship with respect to others of them. In one embodiment of the invention, the E-plane branch arm and the H-plane branch arm of a four-arm wave-guide hybrid junction are effectively extended through to the other side of the common junction point so as to provide two additional branch arms joined to the main wave-guide line in the E-plane and in the H-plane, respectively, which additional arms may be employed either as input or output arms.

A feature of the invention is a modification of the six-arm hybrid junction in accordance with the invention to provide a wide range variable attenuator with constant phase delay.

Another feature is a modification of the six-arm hybrid junction in accordance with the invention to provide a frequency discriminator such as is used in systems for demodulating frequency-modulated microwave signals, and also such as is used in systems for shifting automatically the frequency of the beating oscillator of a microwave receiver to produce an intermediate frequency of exactly the proper value to within any desired limits.

The various objects and features of the invention are discussed more fully in the following detailed description thereof when read in conjunction with the accompanying drawings, in which:

FIG. 1 shows a perspective view of the fundamental four-arm type of hybrid junction known in the prior art;

FIGS. 2, 3 and 4 show perspective views of a six-arm hybrid junction in accordance with the invention applied to the distribution in various proportions of wave power supplied from a single power source connected to one branch arm, or the combination power products of two power sources connected to different branch arms, between four or five loads respectively connected to the other arms.

FIG. 5 shows a perspective view of a modified six-arm hybrid junction in accordance with the invention used as a wide range variable attenuator; and FIG. 6 shows a perspective view of a modified six-arm hybrid junction in accordance with the invention used as a frequency discriminator.

As is well known to the art, when electromagnetic wave power is transmitted down a wave guide the energy is distributed in the space comprising the guide. It is well known also that ordinary two-wire transmission lines in both theory and practice may be considered merely as special cases of the generalized concept of wave guides. However, even though two-wire transmission lines are special cases of wave guides and should properly be described in wave-guide terms, it is found to be more convenient to describe wave guides in terms of the better known constants and functions involved in two-wire transmission line theory. Consequently, in the description hereinafter following the action of electromagnetic waves in a wave guide will be explained in terms of the analogous equivalent values, E, I, and $Z_0$, of a two-wire transmission line. In the above, E represents the voltage across the transmission line and is proportional to the strength of root-mean-square electric field in the wave guide; I represents the current flowing in the conductors of the two-wire transmission line and is proportional to the strength of the magnetic field in the wave guide; and $Z_0$ is the characteristic impedance of the two-wire transmission line and is analogous to the characteristic impedance of the wave guide. No loss of exactitude will be incurred by this means of description.

The hybrid junction shown in FIG. 1 is of the four-arm type such as disclosed in the aforementioned Tyrrell patent. It comprises a main section 1, 2 of straight hollow metal pipe wave guide of elongated rectangular cross-section and two other straight sections 3 and 4 of similar wave guide joined as branches to the main wave guide 1, 2 at an intermediate, common junction point, the three wave guides being relatively disposed so that their longitudinal center-line axes extend in mutually perpendicular directions from the common junction point. The wider faces of the branch wave guide 3 are normal to the direction in which the main wave guide 1, 2 extends, and the narrower faces of the branch wave guide 3 are parallel to that direction. This is a connection in the electric or E-plane, that is, the plane parallel to the lines of electric intensity produced in both joined wave guides when dominant waves are propagated over one of them towards the junction between the two guides, and is equivalent to a series electrical connection of the two guides. The narrower faces of the branch wave guide 4 are normal to the direction in which the main wave guide 1, 2 extends, and the wider faces of the branch guide 4 are parallel to that direction. This is a connection in the magnetic or H-plane, that is, the plane perpendicular to the lines of electric intensity produced in both joined wave guides when dominant waves are propagated over one of them towards the junction between the two guides, which is equivalent to a shunt or parallel electrical connection. The portions 1 and 2 of the main wave guide, respectively extending to opposite sides of the common junction point, and the E-plane branch wave guide 3 and the H-plane branch wave guide 4, each of which extends to only one side of the common junction point, respectively form a different one of the four arms of the hybrid junction.

Reactive tuning elements comprising the tapered metal rod $R_1$ extending across the interior of the main wave guide 1, 2 at the common junction point into the interior of the E-plane wave guide branch 3, and the cylindrical metal rod $R_2$ connected across the interior of the E-plane wave guide branch 3 between the wider faces of the latter at a suitable distance from its junction with the main wave guide 1, 2 and from the axis of that guide, may be utilized to provide optimum impedance matching and thus minimum reflection of wave energy over a wide band of frequencies between the input and output branches of this four-arm hybrid junction and thus to improve the balance of the conjugately connected arm of the junction in the manner disclosed in the copending United States patent application of C. F. Edwards, Serial No. 637,124, filed December 24, 1945, now Patent No. 2,679,582, issued May 25, 1954.

The captions in FIG. 1 indicate for separate inputs $E_1$ and $E_2$ of common frequency applied, as shown, to the branch arms 1 and 2, respectively, the branch arms of the network in which the complex sum, $k(E_1+E_2)$, and the complex difference, $k(E_1-E_2)$, of these voltages appear, where $k$ is a constant multiplying factor at a given frequency. With proper design, impedance matching and terminations for the branch arms, the four-arm hybrid junction of FIG. 1 exhibits these additional properties: the arms 1 and 2 to which the voltage inputs $E_1$ and $E_2$ are respectively applied, are conjugate (a high transmission loss obtains between the connections recited); the sum output arm 4 and the difference output arm 3 are also conjugate; the power of a single voltage input applied to the arm 4 will be divided equally between the output arms 1 and 2; and the power of a single voltage input to the arm 1 will be divided equally between the two output arms 4 and 3.

FIG. 2 shows a hybrid junction in accordance with the invention. This junction differs essentially from the four-arm hybrid junction of FIG. 1 merely in the addition of a fifth branch arm 5 and a sixth branch arm 6. The branch arm 5, identical with the branch arm 3 and collinear therewith, is also joined to the main wave-guide line 1, 2 in the E-plane (series electrical connection) but extends to the opposite side of the junction from branch arm 3. The sixth branch arm 6, identical with the branch arm 4 and collinear therewith, is joined to the main wave-guide line 1, 2 in the H-plane but extends to the opposite side of the junction point from branch arm 4.

Because of geometrical symmetry, the six-arm hybrid junction of FIG. 2 exhibits the following properties: For voltage inputs $E_1$ and $E_2$ of the same frequency applied as shown to the junction through branch arms 1 and 2, respectively, the outputs at arms 4 and 6 are proportional to the complex sum $k(E_1+E_2)$, of the input voltages and the outputs at arms 3 and 5 are proportional to the complex difference $k(E_1-E_2)$ of the two input voltages with a small amount of power feeding through from arm 1 to arm 2 and from arm 2 to arm 1. No collinear arms of the network of FIG. 2 are inherently conjugate to each other; however, either complex sum arm 4 or 6 is conjugate to either complex difference arm 3 or 5; a single voltage input at arm 1 (or at arm 2) divides unequally, as shown in FIG. 3, among the remaining five arms, but the powers appearing in arms 3 and 5 are equal and the powers appearing in arms 4 and 6 are also equal. The distribution observed by tests of such a junction, also noted on FIG. 3, is as follows: arm 2, 11.4 decibels down from the incident power in branch arm 1; branch arms 4 and 6, 7.9 decibels down from the incident power; and branch arms 3 and 5, 6.2 decibels down from the incident power. The junction can be matched with irises in the inputs of the branch arms so that the input power may be divided approximately equally among the five output arms.

Conditions may often arise in microwave design where it is advantageous to supply microwave power to as many as four loads which need not be mutually conjugate but which require the power to be distributed evenly. Also, it may be required in some cases that two of the loads be isolated from (i.e., be conjugate with respect to) the other loads. An example of this case is the problem of supplying power to four loads comprising antennas arranged to radiate in different directions. The application of the six-arm hybrid junction of the invention for this purpose is illustrated in FIG. 4. As shown, the input power is applied to branch arm 1 of the junction, four other arms, 3, 4, 5, and 6, are respectively terminated by different antenna loads, and the distance of the reflecting plunger 7 in the sixth branch arm 2 collinear with the input arm 1, with respect to the center of the junction is adjusted so that the powers in the four output branches 3, 4, 5, and 6, are equal. The expected powers in each output branch arm, as shown in FIG. 4, are 6.85 decibels down from the incident power in branch arm 1. The power-dividing arrangement of FIG. 4 may easily be matched for any frequency by the use of an iris or other type of impedance matching device well known in the art, not shown, in the input arm 1, thus preventing loss of power by reflection. By the inclusion of an impedance matching device, such as an iris, in each arm of the junction, it is possible to do away with the adjustable plunger 7 and supply approximately equal quantities of power to the five loads respectively connected to the branch arms 2, 3, 4, 5 and 6.

FIG. 5 shows the application of the six-arm hybrid junction of the invention to provide a wide range variable attenuator with constant phase delay. As shown, in this application of the junction, the input power of the wavelength $\lambda$ for which the junction is designed, is applied to the junction through one H-plane branch arm 4 and the attenuated output power is taken off from the other H-plane branch arm 6; movable reflecting plungers 8 and 9 are employed in the branch arms 1 and 2, respectively; and the E-plane branch arms 3 and 5 are respectively terminated in their characteristic impedances. With the power applied at branch arm 4, and with the reflecting plungers 8 and 9 in branch arms 1 and 2, respectively, moved to the proper relative distance from the center of the junction so that the phase of each reflected voltage due to branch arms 1 and 2 entering the output branch arm 6 coincides, the attenuation of the output power in branch arm 6 with respect to the incident power in branch arm 4 may be made substantially zero. The power entering arm 4 separates at the junction to enter branch arms 1, 2, and 6. No power enters arms 3 and 5 directly from branch arms 6 or 4 due to physical conjugacy. If the reflecting plungers in arms 1 and 2 are set so that their distances from the center of the junction are effectively $n\lambda/2$ (where $n$ equals 1, 2, 3, etc.), the reflected power will be in phase at the center of the junction with the incident power. The reflected power from branch arm 1 entering branch arms 3 and 5 is cancelled by an equal amount of reflected power which is 180 degrees out of phase with respect to the reflected power from branch arm 1, entering branch arms 3 and 5 from branch arm 2. Since no power is absorbed by the loads connected to branch arms 3 and 5, essentially all the power is available at arm 6 and the attenuation may be made quite small (of the order of 0.1 decibel or less). If the reflecting plungers in arms 1 and 2 are each moved a distance $\lambda/8$ (one towards and one farther away from the center of the junction), the powers reflected from these two plungers will be 180 degrees out of phase with each other, and will cancel in arm 6. One-half of the reflected power from branch arm 1 and one-half of the reflected power from branch arm 2 will enter arm 3 in phase and will be absorbed by the termination therein. The other halves of the reflected power from arms 1 and 2 will enter branch arm 5 in phase and will be absorbed by the termination therein. Since branch arms 6 and 4 are not conjugate with respect to each other, the anticipated power obtained in arm 6 will be about 2.7 decibels down from the incident power in branch arm 4. By moving the plungers 8 and 9 in branch arms 1 and 2, respectively, to distances beyond the $1\lambda/8$ setting from the junction, the in-phase components of the power reflected from the branch arms 1 and 2 can be made to nearly cancel the power remaining in arm 6. An attenuation of about 30 decibels is possible in the latter positions of the two plungers. By removal of either terminated arm 3 or 5 from the junction or by placing a plunger in that arm, the device will still work as a constant phase variable attenuator as described.

Another application of the six-arm hybrid junction of the invention is as a frequency discriminator for use in microwave systems. One type of frequency discriminator circuit widely used at lower frequencies operates on the principle of separately rectifying the sum and the difference of two voltages that differ in phase by 90 degrees at the nominal or means frequency of the system. By the use of a frequency responsive circuit, such as a circuit resonant at the nominal frequency, one of these component voltages is caused to vary in phase as the frequency departs from the nominal value. Accordingly, the differential combination of the rectified voltages will produce a voltage varying in magnitude and polarity with deviations of the input from the nominal frequency. Such circuits have in the past been built up of circuit elements of lumped constants, which procedure is not practical for operation in the microfrequency range. A frequency discriminator employing elements of distributed constants suitable for operation at microwave frequencies is obtained by the use of the six-arm hybrid junction of the invention in the manner illustrated in FIG. 6.

In the frequency discriminator of FIG. 6, the branch arms 1 and 2 of the six-arm hybrid junction are made of equal length and are closed at their outer ends by reflecting plates, as indicated. Equivalent point-contact crystal rectifiers 10 and 11 are mounted between the wide faces of the wave-guide branches 1 and 2 at such distances from the closed ends of these arms as to provide an effective impedance match. The arrangement for mounting the rectifiers 10 and 11 may be similar to that shown in the United States Patent to Sharpless, No. 2,438,521, issued March 30, 1948. A reflecting plunger 12 is inserted in the H-plane branch 4 of the junction and its position is adjusted with respect to the center of the junction to provide the desired phase relation of the reflected wave energy thereat with respect to the wave energy received from the other arms. The outer end of the other H-plane branch arm 6 is connected through a section 13 of wave guide, which may be an extension of the branch arm 6, to the outer end of the E-plane branch arm 3, and a variable reactance, phaser or tuned resonant cavity 14 may be inserted in section 13 for tuning. For an input voltage $E_1$ of frequency varying below and above the nominal frequency applied as shown to the junction through the branch arm 5, the output $k_1E_1\angle\phi$, will appear in the branch arm 1 and an equal but opposite in phase voltage, $-k_1E_1\angle\phi$, will appear in branch arm 2. A voltage, $k_2E_1\angle\theta$, appearing in branch arm 3 reenters the junction through the wave-guide connection 13 and the device 14, to feed a voltage, $k_3E_1\angle\alpha$, to the branch arms 1 and 2. By adjusting the length L of the path extending from the junction of the branch arm 3 with the wave guide 1, 2 through that arm and the wave-guide section 13, 14 to the junction of the H-plane branch 6 with the wave guide 1, 2, and/or by suitable adjustment of the reactance, phaser or tuned cavity 14 in that path, the phase angle $\alpha$ can be made to equal $\phi\pm90$ degrees.

A discriminator characteristic results from the fact that the voltages $+k_1E_1\angle\phi$ and $+k_3E_1\angle\alpha$ in branch arm 1 differ by 90 degrees, the voltages $-k_1E_1\angle\phi$ and $+k_3E_1\angle\alpha$ differ by 90 degrees, and the voltage $+k_1E_1\angle\phi$ in arm 1 and the voltage $-k_1E_1\angle\phi$ in arm 2 differ by 180 degrees. The rectified outputs of the crystal rectifiers 10 and 11 in branch arms 1 and 2, respectively, are taken off through the connections 15 and 16 and are combined in the resistor 17 grounded at its mid-point to produce an output voltage $E_2$ which is the difference of the rectified outputs of the individual crystals. At the center frequency of the input wave the voltages acting on the crystal detectors 10 and 11 are of equal magnitude. However, for frequencies slightly off the center frequency, the phase of the path L is greater or less than 90 degrees, with the result that the resultant voltage applied to one crystal is now larger and the resultant voltage applied to the other crystal smaller. The result is a differential output $E_2$ that varies almost linearly over a small range of frequencies.

In the frequency discriminator of FIG. 6, the input voltage $E_1$ of varying frequency may be applied to the branch arm 4 instead of the branch arm 5 as shown, in which case, the reflecting plunger 12 would be located in the branch arm 5 instead of the branch arm 4 as shown.

The coaxial line type of wave guide employing concentric inner and outer conductors may be used in the branch arms of the hybrid junction in place of the hollow pipe wave guide illustrated, and other types of wave guide than that shown may be used for the main wave guide.

Various other modifications of the multiarm hybrid junction and the applications thereof described and illustrated which are within the spirit and scope of the invention will occur to the persons skilled in the art.

What is claimed is:

1. In combination, a wave guide adapted for transmission of electromagnetic wave energy of a given range of frequencies and at least four other wave guides branching out from the first wave guide at an intermediate common junction point, at least two of the branch guides being connected electrically in series with said first guide and at least two others of said branch guides being connected electrically in parallel therewith so as to provide conjugacy at said given range of frequencies between each series-connected branch guide and each parallel connected branch guide and lack of conjugacy at said range of frequencies between each branch guide and the portions of said first wave guide extending to each side of said common junction point.

2. A wave power dividing network comprising six wave guides, each adapted for transmission of electromagnetic waves of a given range of frequencies, branching out from each other at a common junction point, each of two of the branch guides being joined to a third and a fourth branch guide in the electric plane and the two other branch wave guides being joined to said third and said fourth wave guide in the magnetic plane, so as to provide substantial conjugacy in a given range of frequencies between each of the first two branch guides and each of said other two branch guides and lack of conjugacy at said given frequencies between said third and said fourth branch guide and each of the four other branch guides.

3. In combination, three branching wave guides, each adapted for transmission of electromagnetic waves of a given range of frequencies, extending in mutually perpendicular directions through a common junction point, with portions of each guide located on opposite sides of said common junction point so as to provide a six-arm junction, the two collinear arms of one of said wave guides being joined in the electric plane with the two collinear arms of a second guide at the common junction point and the two collinear arms of the third guide being joined to the two collinear arms of said second guide in the magnetic plane so as to provide conjugacy for applied waves of said given frequency range between each of the two collinear arms of said one guide and each of the two collinear arms of said third guide and lack of conjugacy in said given frequency range between each of the two collinear arms of said second guide and each of the two collinear arms of said one and said third guides.

4. A device for connecting three or more load circuits in wave transmission relation with a source of wave power of given range of frequencies while maintaining at least some of said circuits electrically isolated from each other comprising a network consisting of six wave guide arms each adapted to transmit waves of said range of frequencies, branching out from a common junction point, two of said arms being connected electrically in series with a third and a fourth one of said branching arms and two others of said arms being connected electrically in shunt with said third and fourth branching arms, said source of power to be connected to said network through said third or said fourth branching arm and said three or more load circuits to be respectively connected to said network through a different one of the other five branching arms.

5. A device for providing a desired distribution of wave power of given frequency supplied from a single power source between four different load circuits, comprising one wave guide adapted to transmit waves of said given range of frequencies and four similar wave guides branching out from said main wave guide at an intermediate common junction point, two of the branch wave guides being joined to said main wave guide in the electric plane, two others of the branch wave guides being joined to the main wave guide in the magnetic plane, said source of power to be connected to the end of said main guide at one side of said common junction point, said four load circuits to be respectively connected to said device through a different one of the four branch wave guides so that each circuit receives a portion of the wave power from said source therethrough and a reflecting plunger in the portion of said main wave guide extending to the other side of said common junction point positioned at the proper distance therefrom to give the desired distribution of wave power between the four load circuits.

6. A network for dividing wave power supplied from a single power source between five different load circuits while maintaining at least some of said circuits electrically isolated from each other comprising three branching hollow pipe wave guides of elongated rectangular cross-section, extending in mutually perpendicular directions through a common junction point with a portion of each guide located on each side of said common junction point, the wider faces of two of said wave guides being normal to one of said directions and the wider faces of the other wave guide being normal to another of said directions, said source of wave power to be connected to one end of one of said wave guides so that the wave power therefrom is propagated over that wave guide towards said common junction point, one of said five load circuits to be connected to the other end of said one wave guide and the four other load circuits to be respectively connected to a different end of the other two wave guides.

7. In combination in a wave transmission system, a main wave guide, four other wave guides branching out therefrom at an intermediate common junction point, each of said wave guides being of rectangular cross-section with unequal transverse dimensions so that each is adapted to transmit dominant waves with only one polarization, two of said branch wave guides being joined to the main wave guide in the electric plane and the other two branch wave guides being joined to the main wave guide in the magnetic plane, so that each of the first two branch wave guides is in conjugate relation with respect to each of said other two branch wave guides, and each of the four branch wave guides has a lack of conjugacy with respect to the main wave guide, means to apply dominant waves to said main wave guide and means to supply the portions of the power of the applied waves appearing in each of said branch wave guides to different load circuits.

8. In a wave combining system, a main wave guide, four other wave guides branching out therefrom at an intermediate common junction point, each of said wave guides being adapted to transmit waves of a given frequency, two of the branch wave guides being joined to the main wave guide in the electric plane and the other two of said branch wave guides being joined to the main wave guide in the magnetic plane, so that each of the first two branch wave guides is conjugate to each of said other two branch wave guides, and each of the four branch wave guides has a lack of conjugacy with respect to the main wave guide, means to apply waves of said given frequency to each end of said main wave guide and means to take off power proportional to the complex sum of the equivalent voltages or currents of the two applied waves appearing in each of the two branch wave guides joined to the main wave guide in the magnetic plane and the complex difference of the equivalent voltages or currents of the two applied waves appearing in each of the two branch wave guides joined to the main wave guide in the electric plane.

9. In combination, a six-arm hybrid junction comprising three branching hollow pipe wave guides, each adapted to transmit electromagnetic waves of a given range of frequencies, extending in mutually perpendicular directions through a common junction point, the portions of each guide extending to opposite sides of said common junction point forming respective arms of the hybrid junction, the two collinear arms formed by one guide being joined to a second of said guides in the electric plane and the two collinear arms formed by the third guide being joined to said second guide in the magnetic plane, means for terminating each of the collinear arms of said one guide in its characteristic impedance, means to apply electromagnetic waves of said given frequency to said hybrid junction through one of the two collinear arms formed by said third guide and for taking off the output waves of said given frequency range appearing in the other collinear arm formed by said third guide and a movable reflecting plunger in each of the collinear arms formed by said second guide, the relative positions of which with respect to said common junction point being adjusted to control the relative phase of the wave energies reflected from said plungers entering said other collinear arm formed by said one guide so as to produce the desired amount of attenuation of the output wave energy in that arm.

10. In combination, three branching wave guides of elongated, rectangular cross-section such as to adapt each guide for transmission of electromagnetic waves of a given range of frequencies, the three guides extending in mutually perpendicular directions through a common junction point with a portion of each guide on each side of said common point, the wider faces of a first and a second of said guides being perpendicular to the direction in which the third guide extends with said first and second guides being connected in series electrically at said common point, the wider faces of the third guide being perpendicular to the direction in which said first guide extends with said third guide and said one guide being connected in parallel electrically at said common point, means to terminate said second guide at both ends, a movable reflecting plunger in each portion of said one guide on each side of said common junction point, means to apply electromagnetic wave power of said given frequency to be attenuated to one end of said third guide, and means to move the reflecting plungers in the two sides of said one guide to proper relative distances from the common junction point so as to make the attenuation of the output power from said third guide with respect to the level of the input power thereto of the desired value.

11. A variable attenuator having constant phase delay over a wide range of attenuation comprising a branching arrangement of three wave guides, each of elongated, rectangular cross-section such as to adapt it for transmitting electromagnetic wave energy of given range of frequencies, the three guides extending in mutually perpendicular directions through a common junction point with portions of each guide located on both sides of said common point, the three wave guides being joined at the common junction point in such manner that one guide is connected electrically in series with a second guide and the third guide is connected electrically in parallel with said second guide, said one guide being terminated in its characteristic impedance at both ends, a separate reflecting plunger in the portion of said second guide on each side of said common junction point, adjustable longitudinally in both directions therein, means for applying electromagnetic wave energy of given frequency to be attenuated to one end of said third guide, means for taking off output wave energy of said given frequency from the other end of said third guide and means for adjusting the relative positions of the two movable reflecting plungers in the two portions of said second guide with respect to said common junction point to control the phase of the reflected powers therefrom so as to produce the desired amount of attenuation of said output energy with respect to the level of the input wave energy applied to said third guide.

12. In combination, a six-arm hybrid junction comprising three branching hollow pipe dielectric wave guides, each adapted to transmit waves of a given nominal frequency, extending in mutually perpendicular directions through a common junction point, the portion of each guide extending to opposite sides of said common junction point forming respective arms of said hybrid junction, the two collinear arms formed by one of said guides being joined to a second of said guides in the electric plane and the two collinear arms formed by a third guide being joined to said second guide in the magnetic plane, a different rectifier effectively terminating each collinear arm formed by said second guide, a reflecting plunger in one of the two collinear arms formed by said third guide, means to apply waves of frequency varying over a given range including said nominal frequency to said junction through one of the two collinear arms formed by said one guide, a wave guide connection between the outer end of the other collinear arms formed by said one guide and the outer end of the other collinear arm formed by said third guide, means for making the waves entering the two collinear arms formed by said second guide indirectly through the path including said other collinear arm formed by said one guide, said other collinear arm formed by said third guide and the wave guide connection therebetween differ in phase by 90 degrees from the waves entering said two collinear arms formed by said second guide directly from said one arm of the two collinear arms formed by said one guide, and means to combine the rectified wave outputs of said two rectifiers differentially to produce an output voltage varying approximately linearly with the frequency of the input waves applied to said one of said two collinear arms formed by said one guide.

13. The combination of claim 12, in which the waves directly and indirectly entering the two collinear arms formed by said second guide are made to differ in phase by 90 degrees by properly adjusting the length of said path.

14. In combination, a six-arm hybrid junction consisting of three branching hollow pipe wave guides of elongated, rectangular cross-section such as to adapt each guide for transmission of electromagnetic wave energy of a given nominal frequency, said three guides extending in mutually perpendicular directions through a given junction point, the portion of each guide on each of opposite sides of that point forming a different arm of said hybrid junction, and the three guides being so relatively oriented at the common junction point that the two collinear arms formed by one guide are connected in series electrically with each of the collinear arms formed by a second guide and the two collinear arms of the third guide connected electrically in parallel with each of the two collinear arms formed by said second guide, said second guide being closed at its two ends by reflecting plates and including a separate rectifier in each of its two collinear arms, a reflecting plunger in one of the collinear arms of said third guide, means for supplying a voltage wave of a frequency varying over a range including said nominal frequency to one end of said one guide, a transmission path connecting the other end of said one guide to the other end of said third guide, means for making the phase angle of the voltage fed from said other arm of said one guide indirectly through said transmission path to the two collinear arms of said second guide differ by 90 degrees at said nominal frequency from the phase angle of the voltage fed directly from said one arm of said one guide to said two collinear arms of said second guide and means for combining differentially the rectified voltage outputs of the two rectifiers in said second guide to produce a voltage varying linearly with the variation of the frequency of the supplied waves from the nominal frequency over said range of frequencies.

References Cited in the file of this patent

UNITED STATES PATENTS

| | | |
|---|---|---|
| 2,410,840 | Samuel | Nov. 12, 1946 |
| 2,413,939 | Benware | Jan. 7, 1947 |
| 2,443,612 | Fox | June 22, 1948 |
| 2,445,895 | Tyrrell | July 27, 1948 |